United States Patent

[11] 3,534,742

| [72] | Inventors | William H. Knapp<br>Davenport, Iowa;<br>Richard A. De Pauw, East Moline, Illinois |
|---|---|---|
| [21] | Appl. No. | 864,287 |
| [22] | Filed | Oct. 1, 1969<br>A continuation of Ser. No. 584,054, Sept. 29, 1966, abandoned. |
| [45] | Patented | Oct. 20, 1970 |
| [73] | Assignee | International Harvester Company<br>Chicago, Illinois<br>a corporation of Delaware |

[54] BAR GRATE ROTOR
15 Claims, 3 Drawing Figs.

[52] U.S. Cl. .................................................. 130/27, 56/20
[51] Int. Cl. ...................................................... A01f 12/18
[50] Field of Search .......................................... 130/27.8, 27.8(F), 27.17, 27.19; 56/19, 20, 21

[56] References Cited
UNITED STATES PATENTS

| 953,833 | 4/1910 | Hollingsworth | 130/27 |
| 1,413,758 | 4/1922 | Milton | 130/27 |
| 1,611,979 | 12/1926 | Wyman | 130/27 |
| 1,926,709 | 9/1933 | Bunting | 56/20 |
| 2,320,945 | 6/1943 | Maginn | 130/27 |
| 2,377,238 | 5/1945 | Jorg | 130/27 |
| 3,315,449 | 4/1967 | Morrison et al | 56/21 |

Primary Examiner—Antonio F. Guida
Attorney—Noel G. Artman

ABSTRACT: An elongated rotor for an axial flow combine including a plurality of longitudinally extending radial blades constructed such that they will support the material as it is threshed and separated and yet will produce a minimum fan effect. The construction of the radial blades include open grates that occupy its plane area.

Patented Oct. 20, 1970
3,534,742
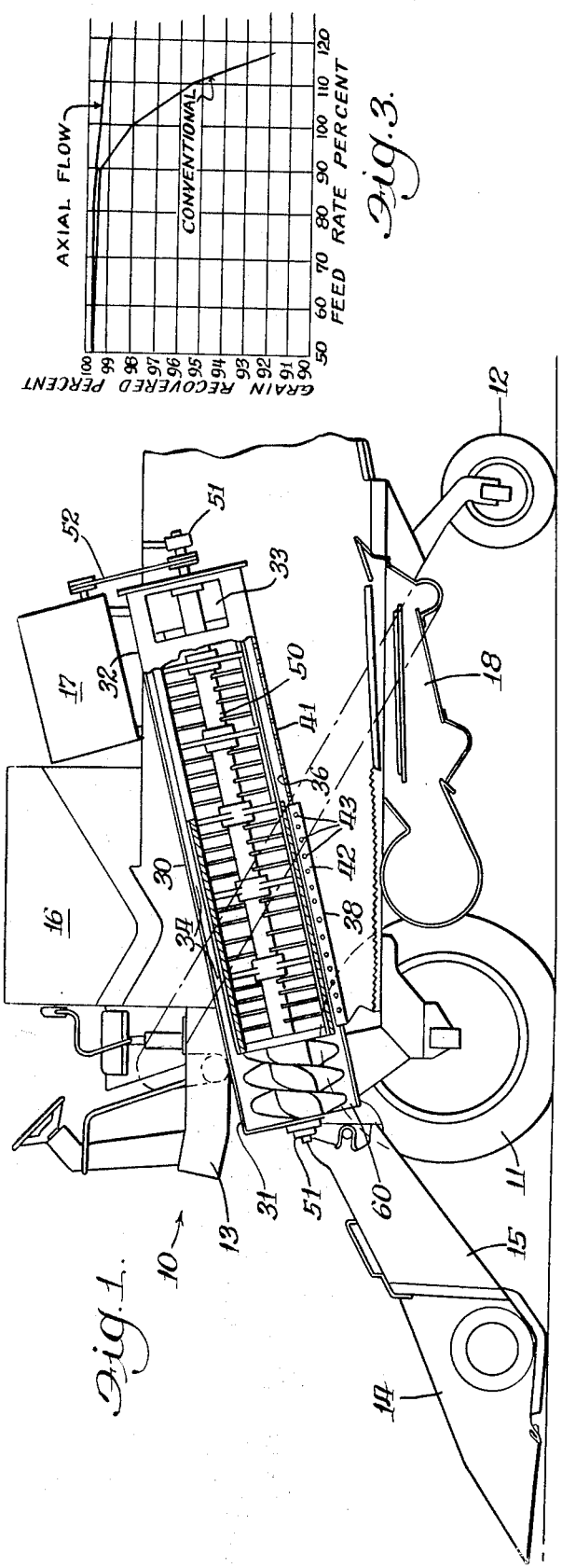
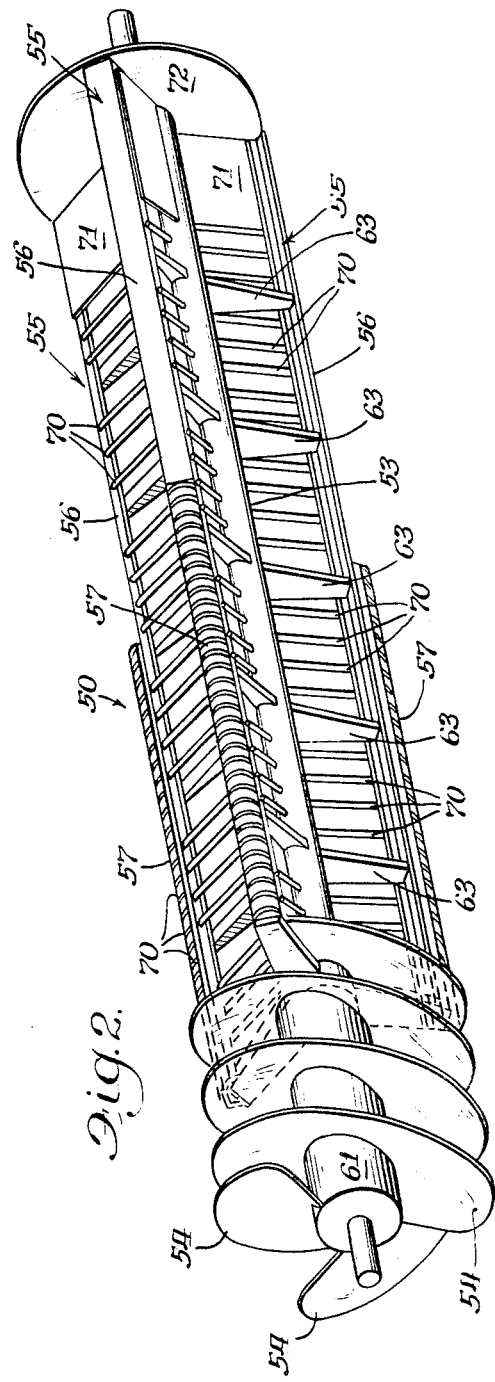
Inventors:
William H. Knapp
Richard A. DePauw
G. David Au Buchon Atty.

BAR GRATE ROTOR

This application is a continuation of our application Ser. No. 584,054, filed Sept. 29, 1966 now abandoned.

The present invention relates generally to improvements in combines and the like and more particularly to a new and improved rotary or axial flow-type combine in which the material flows axially of an open rotor.

In all present commercially available combines, the material to be threshed is fed between a rotating cylinder and a stationary concave in a direction normal to the axis of the rotating cylinder. Much of the grain contained in the material fed to the cylinder and concave passes through the concave as threshed grain. The remainder of the material is conveyed to the separating component of the combine which in conventional combines includes reciprocating or oscillating straw racks, return pans, and chaffer sieves. The subject invention concerns a combine that operates on a completely different principle than the above-described commercially available combines. In the combine described in the subject application an elongated rotor is provided along the longitudinal axis of the combine. The elongated rotor is enclosed within a cylinder having transport fins provided along its upper internal surface and a concave and grate provided along its lower surface. The material to be threshed is fed into the front end of the cylinder and is metered axially towards the rear while being processed by the cooperating elements on the rotor and cylinder. An axial flow-type combine such as this has the obvious advantage over a conventional combine in the simplicity of its drive since it utilizes only simple rotary drives and does not include oscillating or reciprocating elements in the threshing and separating units. This not only simplifies the drive for the separating section, but also reduces vibrations considerably. Furthermore, the elements of an axial flow-type separating section have better structural stability than those of conventional separating section and are thus more durable and reliable. The principle of constructing a combine in which the material flows axially of the rotor is not entirely new. A threshing machine such as this is shown, for example, in the U.S. patent to Schlayer U.S. Pat. No. 1,688,662 of Oct. 23, 1928. Although the basic principle is old, machines of this type have never enjoyed commercial success.

One of the reasons for this failure is that an axial flow-type threshing machine requires more power per unit of clean grain than does the conventional combine. With more powerful engines and better drive members now available, this drawback has become less important. The availability of lightweight, economical and larger power plants and more efficient power trains has also fostered a trend to build combines of greater capacity. The capacity of machines such as a combine can be increased by providing wider grain heads for the machine so that its swath is increased and also by increasing the forward speed of the combine. Generally speaking, the capacity of the various elements of the combine have been increased to handle the added capacity by merely enlarging them, however, there is a practical limit to how large and how heavy a combine can be built. Combines must be of a size and weight such that they can be operated under soft muddy field conditions. Also, since they must be shipped from the manufacturing plant to the user and since they must be transferred from one field to another, the machine must be of a size and weight that can be conveniently transferred over the highways and by rail. The maximum weight permitted on highways, the maximum width and height of bridges and viaducts that are likely to be encountered, restrict the overall size and weight dimensions of a combine. Once these maximum dimensions have been reached, it is no longer a simple matter to increase the capacity of a combine as it is now necessary to increase the efficiency of the various elements of the combine without a corresponding increase in size or weight.

It has been found that the separating section of the conventional combine has an efficiency curve that changes at a very low rate until the combine feed rate exceeds a set amount. After this point, the efficiency curve of the conventional separating section changes quite steeply. Thus when using a conventional combine and it is desired to keep the grain losses within an acceptable range (for example 2 percent), it is necessary that the feed rate through the combine must be maintained within the flat portion of the efficiency curve. It has been found that separating units of the axial flow-type construction are more efficient at a given feed rate than are conventional separators at equal feed rates. Also, it has been found that an axial flow-type separator compares in size and weight to a conventional combine separator.

The grain recovered percent (percent of grain fed into combine that reaches the grain tank) has been plotted against the feed rate percent for the largest combine presently sold by International Harvester Company and also for an axial flow-type combine. The graph is shown as FIG. 3. The graph illustrates that the grain recovered percent in the conventional and the axial flow-type machines are comparable for feed rates less than 100 percent of the conventional combine. However, as the feed rate increases beyond this reference point, the percent of grain recovered in the conventional machine changes rapidly while the percent of grain recovered in the axial flow-type changes very little. When the conventional machine is recovering 98 percent of the grain, it is considered to be operating at 100 percent of its feed rate. When operating the axial flow-type machine in the same field under identical test conditions at a feed rate equal to what is considered to be 100 percent of the conventional it recovers 99.4 percent of the grain. A comparison of these performance curves illustrate that at lower feed rate percents, the difference between the grain recovered percents are less. However, as the feed rate exceeds this reference point, the difference widens rapidly. For example, when the combines are operating at feed rates of 110 percent, the conventional recovers 95.2 percent and the axial flow-type recovers 99.3 percent of the grain. Thus it is seen that the axial flow-type machines are desirable if the feed rates of combines are to be increased.

During threshing and separating, there is created a large amount of light material classified as chaff and fines. In a conventional combine, some of the chaff and fines is discharged with the straw and some is collected with the uncleaned grain. The conventional combine is provided with a cleaning system to separate chaff and fines from the grain and to deposit the clean grain in the grain tanks. As an example when operating in a field where one-half of the crop by weight is grain and the other half is waste, for every 6.4 lbs. of material fed into a conventional combine, approximately 2.2 lbs. of material will be discharged as waste over the straw walkers and 1 lb. of material will be discharged as waste through the cleaning system. The grain tank, in this example, will receive 3.2 lbs. of clean grain. In this example 4.2 lbs. of material were processed through the cleaning system and 1.0 lbs. of this was discharged as waste. The cleaning system on conventional combines are built to handle material having approximately this ratio of waste to clean grain. The effectiveness of conventional combine cleaning systems improve as the ratio of waste to clean grain is decreased or minimized.

Another reason for the failure of the axial flow-type combine as a commercially acceptable machine is now thought to be attributed to its characteristic of depositing a larger percentage of chaff with the uncleaned grain than does the conventional combine. As a second example, an axially flow-type combine of the type shown in the above-referred to Schlayer patent, operating in the same field of the first example, might divide every 6.4 lbs. of unthreshed material into 1.6 lbs. of material to be discharged as waste through the straw discharge, and 1.6 lbs. of material as waste through the combine cleaning system. In this second example, 4.8 lbs. of material must be processed through the cleaning system to salvage 3.2 lbs. of clean grain. Thus this machine would require a cleaning system that is more effective than the cleaning system of a conventional combine. For this reason, for an axial flow-type machine to compare favorably with a conventional combine, it must be improved such that it will discharge more of the chaff with the straw and thus not require a more effective cleaning system of a greater capacity than a corresponding conventional combine. It is believed that the rotors in the prior are axial flow-type threshing machine functioned as centrifugal fans creating an air current flowing through the grate located in the bottom portion of the cylinder. This current of air carried with it the light chaff and fines to thus account for the large quantity of chaff and fines received in the cleaning system.

It was the purpose of a prior invention to provide a rotor that will not create a draft flowing through the cylinder grate and thus permit more chaff and fines to be discharged with the straw. This objective was accomplished by constructing the rotor of a tubular core having a plurality of flat radial arms lying within the plane of rotation. The plurality of flat radial arms were connected at their free ends by elongated members that were parallel to the core. The elongated members were shaped such that they would not function as fan blades. In this construction the rotor arms were made up of an open framework consisting of the tubular core, flat radial arms and an elongated member. Reference may be made to the copending application of Edward William Rowland-Hill et al., U.S. patent application Ser. No. 576,151, filed Aug. 30, 1966, for more complete disclosure of this open rotor.

It has been found that with open rotor arms such as disclosed in the above referred to application, there is a tendency for some material to pass through the large openings of the rotor arms and thereby avoid processing by the rotor and cylinder. This material tends to remain stationary with the elongated members of the rotor orbiting around it. There is a tendency for material acting in this manner to become entangled into a mass which grows by absorbing additional material. This large mass of material will be prevented by the radial arms from moving axially of the rotor and is not centrifuged to the periphery and thus will not be discharged from the cylinder and will create an obstruction to the normal flow of material within the cylinder. Eventually a portion of the mass will find its way between the threshing elements and the entire mass will attempt to follow. This will result in overloads (*i.e.* slowdowns) and slug stalls which significantly effect the performance of the unit. The combine must then be shut down and the entanglement manually removed.

The invention disclosed herein remedies this undesirable characteristics of an open rotor while retaining its desirable characteristics. This has been accomplished by filling in each of the rotor arms with spaced relatively small diameter radial bars. The size and aerodynamic shape of the radial bars are such that they do not produce unwanted centrifugal air currents. The radial bars form a grille work that will cause all the bulk material to revolve along with the rotor permitting it to be centrifuged to the periphery where it is threshed and separated. This improvement from the open rotor has eliminated the possibility of large accumulations of material within the cylinder and has enhanced the normal flow of material through the combine.

In the combine disclosed herein, the function of threshing and separating are both performed within the cylinder through the action of the rotor. Conventional rasp bars are mounted axially along the front section of the rotor where the threshing function is performed. By so constructing the threshing and separating section of the combine there is only one moving part in this section, the rotor. The drive for rotating the rotor is obviously much simpler than the several drives required in the threshing and separating sections of conventional combines. Thus the machine not only can handle a larger capacity without a corresponding reduction in efficiency, but also is simpler and less susceptible to mechanical failures.

An object of the present invention is the provision of an open bar grate rotor for an axial combine that will create a minimum of centrifugal air currents during operation.

Another object is to provide an open rotor for an axial combine including radial bars forming a bar grate.

Still another object is to provide a bar grate rotor for an axial combine that will insure that any accumulations of material are revolved along with the rotor.

Yet another object of the present invention is the provision of an open bar grate rotor having three blades.

Still another object of the present invention is the provision of an open bar grate rotor having multiple blades each having a closed flat portion at its rear end that functions as a fan and also as a paddle.

These and other objects of the invention will become more apparent from the specification and drawings, wherein:

FIG. 1 shows a side view of the axial flow-type combine having portions broken away for clarity;

FIG. 2 is a pictorial view of a preferred embodiment of the rotor, and

FIG. 3 is a graph comparing performance curves of axial flow and conventional combines.

Referring now to the drawings wherein like reference characters designate like or corresponding parts throughout the several views, there is shown in FIG. 1, a combine generally designated 10 having drive wheels 11, dirigible wheels 12, an operator's platform 13, a header 14, a feeder 15, a grain storage tank 16, an engine 17, and a conventional cleaning system 18. The combine as seen in FIG. 1 does not include conventional threshing and separating sections, but rather incorporates the threshing and separating sections into a single unit including an elongated cylindrical member 30 having a rotor 50 mounted therein.

The elongated cylindrical member 30 is arranged along the longitudinal axis of the combine 10 and includes a front end 31 and a rear end 32. Material to be threshed is fed into the elongated cylindrical member 30 through an opening 60 in the front end 31. The material fed into the front end of the cylindrical member 30 is processed as it is metered through the member towards the rear end 32. The threshed grain escapes from the elongated cylindrical member 30 through the apertured bottom made up of a concave 38 and grate 41. The straw and other waste material is discharged from the elongated cylindrical member 30 through a straw discharge opening 33 formed in the rear end 32. A plurality of spiral transport fins 34 are secured to the upper internal surface 35 of the cylindrical member 30. The transport fins function to index the material axially through the cylindrical member from the front end to the rear end.

The lower surface 36 of the elongated cylindrical member 30 has an irregularly shaped internal surface and has apertures formed therein. The apertures are of a size to permit the passage of grain therethrough. The lower surface 36 is divided into a front threshing area that is in the form of a conventional concave 38. The lower surface 36 also includes a rear separating area including a removable or interchangeable perforated sheet or grate 41 that is normally less aggressive than the concave 38 and has smaller apertures. The concave 38 is of the conventional construction including a plurality of parallel ribs 42 having apertures therein through which a plurality of wires 43 are threaded. The grate 41 can be of the rod and bar type or can be made from a perforated sheet of material and is interchangeable so a grate having the appropriate size apertures can be installed for the particular crop being harvested.

The rotor 50 is journalled for rotation in the elongated cylinder member 30, by bearings 51 and is drivingly connected to the engine 17 by a drive designated 52. The rotor 50 includes a plurality of arms or blades 55, a tubular core 53 and a plurality of short front helices 54 that are carried by the rotor 50 at its front end. There is a separate corresponding helix 54 for each of the arms or blades 55 and the helices are mounted on a common drum 61. Thus, if the rotor 50 has two arms 55 there will be two separate short front helices 54 and if the rotor 50 includes three arms there will be three short front helices 54. Each of the arms 55 of the rotor 50 are made of a plurality of radially extending arms 63 arranged in groups lying in planes parallel to the rotor axis. The radially extending arms 63 have free ends that are connected by longitudinally extending members 56. Between radially extending arms 63 there are a plurality of radially extending solid round bars 70 that extend from the core 53 to the members 56. The bars 70 form a bar grate across the plane of each arm or blade 55 and are of a size and shape such that they do not create centrifugal air currents upon operation of the rotor 50. The bars 70 do not serve as part of the structural framework of the rotor 50 and thus can be made of small diameter bar stock. The bars are spaced from each other and the arms 63 such that an open non-fanning blade is provided that will carry with it any accumulation of material.

As can be best seen in FIG. 2 a preferred embodiment of rotor 50 has three blades 55 equally spaced such that the rotor is balanced. The three bladed rotor provides an enclosure between adjacent blades that confine to some extent but does not unduly restrict the material such that it will permit threshing and separating in the lower portion of the cylinder 30 and indexing of the material towards the straw discharge opening 33 in the upper portion of the cylinder 30.

At the rear end of rotor 50 each blade 55 is provided with a closed flat plate 71 that functions both as a paddle and as a fan. The rotor has an end disk 72 abutting the flat plates 71 and located rearwardly thereof. The flat plates function to throw material through the straw discharge opening and to create an air current following the same path. The air exiting the cylinder through the straw discharge opening 33 is drawn upwardly through the concave 38 and grate 41 and from the front helix. The air current carries with it dust and fines created in the threshing and separating process. By discharging dust and fines with the straw the combine cleaning system is relieved of the requirement to eliminate this portion of the waste material from the grain.

The longitudinally extending members 56 are formed of angle irons having a small flange lying in the plane of the arms 55 such that there is very little fanning effect upon rotation of the rotor. Conventional rasp bars 57 are secured to the outer surface of the longitudinally extending members 56 in the threshing area of the cylinder member 30. When the rotor 50 revolves the rasp bars 57 in cooperation with the concave 38 functions to thresh the material and the grate 41 in cooperation with the rotor 50 functions to separate the material.

The threshed and separated grain passing through the concave 38 and grate 41 respectively is then processed through the conventional cleaning unit 18 after which it is elevated and deposited in the grain tank 16.

It should be understood, of course, that the foregoing disclosure relates to only a preferred embodiment of the invention and that numerous modifications or alterations may be made therein.

We claim:

1. An axial flow combine including an elongated cylindrical member having a front end and a rear end, spiral transport fins secured to said cylindrical member along its upper internal surface and extending from said front end to said rear end, the lower surface of said cylindrical member having apertures formed therein of a size to permit the passage of grain;
   a rotor mounted for rotation within said cylindrical member about an axis, said rotor extending from the front to the rear of said cylindrical member, said rotor including:
   a core;
   a short front helix adapted to receive material fed into the front end of said cylindrical member and to propel it in an axial direction toward the rear of said cylindrical member, a plurality of arms extending outwardly away from said core in fixed proximity relative to said rotor axis, said arms terminating in free ends adjacent the internal surface of said cylindrical member, groups of said arms lying in a plane passing through said rotor axis, a longitudinally extending member associated with each of said groups and secured to the free ends of the arms of its associated group, open grates connected to said rotor, lying in said plane and occupying the spaces defined by adjacent arms, the core and the longitudinally extending members to thus form longitudinally extending blades, the space between said core and adjacent blades being open and unencumbered so that material contained therein is free to advance longitudinally of the rotor; and
   means for driving said rotor.

2. An axial flow combine including an elongated cylindrical member having a front end and a rear end, spiral transport fins secured to said cylindrical member along its upper internal surface and extending from said front end to said rear end, the lower surface of said cylindrical member having apertures formed therein of a size to permit the passage of grain; a rotor mounted for rotation about an axis within and extending from the front to the rear of said cylindrical member;
   said rotor including;
   a core;
   a plurality of arms, extending outwardly away from said core in fixed proximity relative to said rotor axis said arms terminating in free ends adjacent the internal surface of said cylindrical member, groups of said arms lying in plane passing through said rotor axis;
   longitudinally extending members secured to said free ends of each of said groups;
   open grates connected to said rotor lying in said planes and occupying the spaces defined by adjacent arms, the core and the longitudinally extending members to thus form longitudinally extending blades, the space between said core and adjacent blades being open and unencumbered so that material contained therein is free to advance longitudinally of the rotor; and
   means for driving said rotor.

3. A rotor for use with an axially flow-type combine comprising:
   an elongated core formed about a rotor axis and having a front end and a rear end;
   a plurality of arms extending outwardly away from said core in fixed proximity relative to said rotor axis, said arms being of equal length and terminating in free ends, groups of said arms lying in planes parallel to said rotor axis;
   longitudinally extending members secured to said free ends of each of said groups;
   open grates connected to said rotor lying in said planes and occupying the space defined by adjacent radially extending arms, the core and the longitudinally extending members to thus form longitudinally extending blades, the space between said core and adjacent blades being open and unencumbered so that material contained therein is free to advance longitudinally of the rotor.

4. The invention as set forth in claim 3 wherein said rotor also includes, a short helix carried on the front end of the rotor and arranged to propel material in an axial direction along the rotor.

5. The invention as set forth in claim 3 wherein said rotor also includes:
   a fan and straw discharge means carried by the rear end of the rotor; and
   said fan and discharge means comprising solid plates carried by the rear end of the rotor and lying in said planes.

6 The invention as set forth in claim 4 wherein said rotor also includes:
   a fan and straw discharge means carried by the rear end of the rotor; and
   said fan and discharge means comprising solid plates carried by the rear end of the rotor and lying in said planes.

7. The invention as set forth in claim 1 wherein said rotor also includes:
   a fan and straw discharge means carried by the rear end of the rotor; and
   said fan and discharge means comprising solid plates carried by the rear end of the rotor and lying in said planes.

8. The invention as set forth in claim 2 wherein said rotor also includes:
   a fan and straw discharge means carried by the rear end of the rotor; and said fan and discharge means comprising solid plates carried by the rear end of the rotor and lying in said planes.

9. The invention as set forth in claim 1 wherein; there are three groups of arms equally spaced about said tubular core such that said rotor is balanced.

10. The invention as set forth in claim 2 wherein; there are three groups of arms equally spaced about said tubular core such that said rotor is balanced.

11. The invention as set forth in claim 3 wherein; there are three groups of arms equally spaced about said tubular core such that said rotor is balanced.

12. An axial flow combine including an elongated cylindrical member having a front end and a rear end, spiral transport fins secured to said cylindrical member along its upper internal surface between said front end and said rear end, the lower surface of said cylindrical member having apertures formed therein of a size to permit the passage of grain;
a rotor mounted for rotation within said cylindrical member about an axis extending axially of said member, said rotor extending from the front to the rear of said cylindrical member, said rotor including:
a core;
a short front helix adapted to receive material fed into the front end of said cylindrical member and to propel such material in an axial direction toward the rear of said cylindrical member, a plurality of arms extending outwardly away from said core in fixed proximity relative to said rotor axis, said arms having outer ends adjacent the internal surface of said cylindrical member, groups of said arms lying in respective planes extending lengthwise of said rotor axis, longitudinally extending members respectively associated with each of said groups and secured to said outer ends of the arms of its associated group, and open grates connected with said rotor and lying in respective of said planes and occupying the spaces defined by adjacent arms, the core and the longitudinally extending members to thus form longitudinally extending circumferentially spaced blades defining passages therebetween within said elongated cylinder, said passages being open and unencumbered so that material contained therein is free to advance longitudinally of the rotor; and
means for driving said rotor.

13. An axial flow combine including an elongated cylindrical member having a front end and a rear end, spiral transport fins secured to said cylindrical member along its upper internal surface between said front end and said rear end, the lower surface of said cylindrical member having apertures formed therein of a size to permit the passage of grain;
a rotor mounted for rotation about an axis within and extending from the front to the rear of said cylindrical member;
said rotor including:
a core;
a plurality of arms extending outwardly away from said core in fixed proximity relative to said rotor axis, said arms having outer ends adjacent the internal surface of said cylindrical member, groups of said arms lying in respective planes extending lengthwise of said rotor axis, longitudinally extending members respectively associated with each of said groups and secured to said outer ends of the arms of its associated group,
open grates connected with said rotor lying in respective of said planes and occupying the spaces defined by adjacent arms, the core and the longitudinally extending members to thus form longitudinally extending circumferentially spaced blades defining passages therebetween within said elongated cylinder, said passages being open and unencumbered so that material contained therein is free to advance longitudinally of the rotor; and
means for driving said rotor.

14. A rotor for use with an axially flow-type combine comprising:
an elongated core formed about a rotor axis and having a front end and a rear end;
a plurality of arms extending outwardly away from said core in fixed proximity relative to said rotor axis, said arms being of equal length and having outer ends, groups of aid arms lying in respective planes extending lengthwise of said rotor axis;
longitudinally extending members respectively associated with each of said groups and secured to said outer ends of the arms of its associated group;
open grates connected with said rotor lying in respective of said planes and occupying the space defined by adjacent arms, the core and the longitudinally extending members to thus form longitudinally extending circumferentially spaced blades defining passages therebetween, said passages being open and unencumbered so that material contained therein is free to advance longitudinally of the rotor.

15. An axial flow combine including an elongated cylinder having a front end and a rear end, spiral transport fins secured to said cylinder along the upper part of its internal surface between said front end and said rear end, the lower part of the internal surface of said cylinder having apertures formed therein of a size to accommodate the passage of grain therethrough:
a rotor mounted for rotation within said cylinder about an axis extending axially of said cylinder, said rotor extending from the front to the rear of said cylinder, said rotor including;
a core,
a short helix adapted to receive grain-bearing material fed into the front end of the cylinder and to propel such material in an axial direction toward the rear end of said cylinder,
open-grate type blades mounted on said core, said blades extending lengthwise of the core between the helix and said rear end of the cylinder and being spaced apart circumferentially of the core, said blades also extending toward the cylinder internal surface and outwardly from the core in fixed relation therewith in respective planes parallel with the rotor axis to divide the interior of the cylinder into passages receptive of the grain-bearing material fed from the helix into the cylinder, said passage being open to facilitate passage of the material therein axially of the cylinder,
each blade having an outer edge portion disposed contiguously with the cylinder inner surface in cooperative grain-threshing relation therewith attendant to rotation of the rotor; and
means for rotating the rotor.